United States Patent
Li

(10) Patent No.: US 8,379,579 B2
(45) Date of Patent: Feb. 19, 2013

(54) MANAGEMENT METHOD AND AN APPARATUS FOR REVERSE LINK IN A MULTICARRIER WIRELESS COMMUNICATION SYSTEM

(75) Inventor: Peng Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1393 days.

(21) Appl. No.: 12/039,116

(22) Filed: Feb. 28, 2008

(65) Prior Publication Data

US 2008/0159248 A1 Jul. 3, 2008

Related U.S. Application Data

(63) Continuation of application No. PCT/CN2006/002121, filed on Aug. 21, 2006.

(30) Foreign Application Priority Data

Aug. 28, 2005 (CN) .......................... 2005 1 0036885

(51) Int. Cl.
 *H04W 4/00* (2009.01)
 *H04W 72/04* (2009.01)
(52) U.S. Cl. ........................................ 370/329; 455/450
(58) Field of Classification Search .................. 370/230, 370/235, 310, 322, 329, 331, 332, 335, 341, 370/342, 348, 431, 433, 437, 441, 443, 444, 370/462, 468; 455/450–453, 69, 516–522, 455/67.11, 67.7, 423, 436, 446
See application file for complete search history.

(56) References Cited

U.S. PATENT DOCUMENTS

| | | | |
|---|---|---|---|
| 6,735,188 | B1 | 5/2004 | Becker et al. |
| 6,807,160 | B1 | 10/2004 | Laroia et al. |
| 7,120,134 | B2 | 10/2006 | Tiedemann, Jr. et al. |
| 7,701,844 | B2 | 4/2010 | Terry |
| 2003/0048764 | A1* | 3/2003 | Diep et al. ................ 370/335 |

(Continued)

FOREIGN PATENT DOCUMENTS

| CA | 2 597 303 | 8/2006 |
|---|---|---|
| CN | 1330465 | 1/2002 |

(Continued)

OTHER PUBLICATIONS

CDMA2000 High Rate Packet Data Air Interface Specification, Version 2.0, 3GPP '04.60, Mar. 2007, pp. i-1Xiv, 1-1-1-19, 7-31, 7-102-7-116, 7-126-7-134, 7-180-7-199, 7-202-7-212, 9-382-9-421 (total 182 pages),http://www.3gpp2.org/public_html/specs/C.S0024-B_v2.0_071012.pdf.*

(Continued)

*Primary Examiner* — Habte Mered
(74) *Attorney, Agent, or Firm* — Slater & Matsil, L.L.P.

(57) ABSTRACT

In a reverse link management method in a multicarrier wireless communication system, an access terminal AT sends a Reverse Link Management Message to an access network AN. The Reverse Link Management Message carries information of the reverse link that the AT dropped. The AN sends the Traffic Channel Assignment Message to AT, and assigns a new reverse carrier link according to the received the Reverse Link Management Message. The AT establishes a reverse carrier link (reverse link) based on said Traffic Channel Assignment Message and transmits data on the new reverse carrier link. According to this method, the AT can actively report the number of its containing reverse links to AN and inform the AN of the reverse links it has dropped, without further modifying other messages and steps in terminal connection process.

21 Claims, 3 Drawing Sheets

U.S. PATENT DOCUMENTS

| | | | |
|---|---|---|---|
| 2006/0013182 A1* | 1/2006 | Balasubramanian et al. | 370/343 |
| 2006/0068826 A1* | 3/2006 | Leonard | 455/522 |
| 2007/0036121 A1* | 2/2007 | Cherian et al. | 370/342 |
| 2007/0070908 A1* | 3/2007 | Ghosh et al. | 370/236 |
| 2009/0093255 A1* | 4/2009 | Balasubramanian | 455/450 |
| 2009/0196196 A1* | 8/2009 | Ghosh et al. | 370/252 |
| 2010/0169724 A1 | 7/2010 | Terry | |

FOREIGN PATENT DOCUMENTS

| | | |
|---|---|---|
| CN | 1541457 A | 10/2004 |
| CN | 1645860 | 7/2005 |
| EP | 1 251 663 A2 | 10/2002 |
| EP | 1 212 849 B1 | 7/2005 |
| KR | 2002-0080068 A | 10/2002 |
| KR | 10-2005-0042718 | 5/2005 |
| WO | 2004114704 | 12/2004 |

OTHER PUBLICATIONS

CDMA2000 High Rate Packet Data Air Interface Specification, Version 1.0, 3GPP, May 2006, pp. 1-2-1-9, 10-409-10-406 (total 17 pages), http://www.3gpp2.org/Public_html/specs/C.S0024-B_v1.0_060522.pdf.*

TSG-C SWG 2.5 Chair Contribution Status, C25-20050816-001R6, Aug. 2005, 16 pages.

3GPP2, "cdma2000 High Rate Packet Data Air Interface Specification," 3rd Generation Partnership Project 2, 3GPP2 C.S0024-A, Version 1.0, Mar. 2004, 1,083 pages.

Written Opinion of the International Searching Authority, International Application No. PCT/CN2006/002121, Date of mailing: Dec. 21, 2006, 8 pages.

International Preliminary Report on Patentability, International Application No. PCT/CN2006/002121, Date of issuance: Mar. 4, 2008, 10 pages.

Korean Office Action, Korean Application No. 10-2008-7007147, Date of transmission: Feb. 26, 2010, 11 pages.

Korean Notice of Decision for Final Rejection, Korean Application No. 10-2008-7007147, Date of transmission: Sep. 16, 2010, 6 pages.

Canadian Office Action, Application No. 2,620,522, Dated Mar. 9, 2011, 8 pages.

* cited by examiner

MANAGEMENT METHOD AND AN APPARATUS FOR REVERSE LINK IN A MULTICARRIER WIRELESS COMMUNICATION SYSTEM

CROSS REFERENCE TO RELATED APPLICATIONS

This application is a Continuation of PCT/CN2006/002121 filed Aug. 21, 2006, and claims the benefit of Chinese Patent Application No. 200510036885.1 filed on Aug. 28, 2005, both of which are incorporated by reference herein. The PCT application published in Chinese as WO2007/025460 A1.

FIELD OF THE INVENTION

The present invention relates to the field of wireless communication technology, and in particular to a management method and an apparatus for reverse link in a multicarrier wireless communication system.

BACKGROUND OF THE INVENTION

Single-carrier transmission is adopted in the existing CDMA2000 1xEvolution-Data Optimized (1xEV-DO) technology. In a 1xEV-DO system, an Access Terminal (AT) only uses one reverse carrier link to transmit information.

A higher data transmission rate is required for the development of data services. The Third Generation Partnership Project 2 (3GPP2) has proposed a new air interface evolution plan. In the first phase of the plan, a great increase in air interface data rate is enabled through Multiple Carrier EV-DO (NxEV-DO). It is required that the forward data rate is no lower than Nx3.1 Mbps and the reverse data rate is no lower than Nx1.8 Mbps, in which N is the number of carriers used by an Access Network (AN) or the AT. Further, it is required that the forward and reverse carriers be assigned dynamically and independently through the cooperation of the AN and the AT. The number of forward carriers and the number of reverse carriers are not required to be symmetric.

In an NxEV-DO system, an AT should be able to request an AN for the number of reverse carrier links the AT can support according to the AT's current power amplification state or other factors, and also be able to drop one or more reverse carrier links according to its power amplification state or other factors and report this to the AN.

FIG. 1 is a diagram illustrating the structure of a 1xEV-DO system, where the direction of a forward carrier link is defined from the AN to the AT and the direction of a reverse carrier link is defined from the AT to the AN. The components of the 1xEV-DO system are respectively described as follows:

Access Network (AN) is a network equipment configured to provide data connectivity between a packet switched data network (typically the Internet) and the ATs, and the AN is equivalent to a base station in a CDMA2000 system.

A packet Control Function unit (PCF unit) mainly provides between a wireless link and a wire link functions such as mapping, call control, mobility management, session management, data buffering and forwarding, and accounting information collection.

A packet Data Serving Node (PDSN) mainly provides functions such as link management, mobility management, address distribution, accounting information collection, data routing and tunnel encapsulation, and also supports the function of foreign agency for Mobile IP.

An accounting, Authentication, Authorization server (AAA server) mainly provides functions such as identity authentication and address distribution.

A mobile Switching Center (MSC) is a circuit domain voice switching center through which the circuit domain voice service is introduced.

In the existing 1xEV-DO system, when performing a configuration negotiation or establishing a traffic channel, the AT needs to establish a connection. There are mainly the following situations:

The AT initiates a connection request on its own initiative;

The AN sends a paging message, and the AT initiates a connection request when receiving the paging message;

The AT initiates a connection request when an initial establishment of a session or a configuration negotiation is required.

As shown in FIG. 2, the message flow in the case that the AT initiates a connection request on its own initiative includes the following processes.

S01: The AT sends a Connection Request.

S02: The AT sends a Route Update message to indicate the wireless circumstance.

S03: The AN sends a Media Access Control (MAC) layer Acknowledgement message to confirm that the Route Update message is received.

S04: The AN sends a Traffic Channel Assignment message.

S05: The AT establishes a Reverse Traffic Channel (RTC) and sends a pilot signal and a Data Rate Control (DRC) signal.

S06: The AN sends an RTC ACK message to confirm that the RTC is received.

S07: The AT sends a Traffic Channel Complete message on the reverse traffic channel.

S08: The AT starts to exchange data with the AN.

It can be seen from the prior art:

The AT is unable to request the AN for a reverse carrier link;

The AN does not know the number of reverse carrier links desired by the AT;

Only one reverse carrier link can be assigned to the AT, and the peak rate of the reverse carrier link is just 1.8 Mbps;

The forward and reverse data rates can not meet the requirement of the future service.

SUMMARY OF THE INVENTION

An embodiment of the invention provides a reverse link management method in a multicarrier wireless communication system, so that the AT can flexibly adjust the reverse carrier links according to its capability of supporting the reverse carrier links.

A reverse link management method used in a multicarrier wireless communication system according to an embodiment of the invention includes:

sending, by an Access Terminal, a Reverse Link Management message to an Access Network (AN), the Reverse Link Management message carrying information of one or more reverse carrier links that the Access Terminal has dropped.

Preferably, the Access Network assigns one or more reverse carrier links according to the received Reverse Link Management message and sends a Traffic Channel Assignment message to the Access Terminal;

the Access Terminal establishes the one or more reverse carrier links according to the Traffic Channel Assignment message.

Preferably, the Reverse Link Management message is transmitted on a reverse access channel or a reverse traffic channel.

Preferably, the Reverse Link Management message carries information of the number of reverse carrier links that the Access Terminal currently can support.

Preferably, the Reverse Link Management message contains a message sequence number, a link dropped indication and reverse link index information.

Preferably, a correspondence relationship exists between the reverse link index information of the Reverse Link Management message and the one or more reverse carrier links assigned according to the Traffic Channel Assignment message.

Another reverse link management method according to an embodiment of the invention includes the following processes:

sending, by an Access Terminal, a first Reverse Link Management message or a second Reverse Link Management message to an Access Network (AN), the first Reverse Link Management message carrying information of one or more reverse carrier links that the Access Terminal has dropped and the second Reverse Link Management message carrying information of the number of reverse carrier links that the Access Terminal currently can support.

Preferably, the reverse link management is further implemented through the following processes:

the Access Network sends a Traffic Channel Assignment message to the Access Terminal so as to assign one or more new reverse carrier links according to the received first Reverse Link Management message or the received second Reverse Link Management message;

the Access Terminal establishes the one or more reverse carrier links according to the Traffic Channel Assignment message.

Preferably, the first Reverse Link Management message or the second Reverse Link Management message is transmitted on a reverse access channel or in an existing reverse traffic channel.

Preferably, the first Reverse Link Management message contains a message sequence number, a link dropped indication and reverse link index information.

Preferably, a correspondence relationship exists between the reverse link index information of the first Reverse Link Management message and the one or more new reverse carrier links assigned according to the Traffic Channel Assignment message.

An Access Terminal is further provided according to an embodiment of the invention, which includes a terminal entity, a link control unit and a message transmission unit, wherein the message transmission unit sends a Reverse Link Management message to an Access Network (AN), according to a control signal sent by the link control unit;

the link control unit receives a Traffic Channel Assignment message sent by the Access Network, and controls the Access Terminal to establish one or more reverse carrier links according to the Traffic Channel Assignment message.

To sum up, in the technique solution of an embodiment of the invention, the Access Terminal can request the Access Network for the desired number of reverse carrier links and also can report to the Access Network the information of one or more reverse carrier links the Access Terminal has dropped.

The Reverse Link Management message does not make any modification to the existing messages. Therefore, the backward compatibility can be kept.

The Reverse Link Management message has a short length and occupies less air interface wireless resource.

The Access Terminal may request or drop one or more reverse carrier links dynamically and flexibly according to need.

The Access Terminal sends a Reverse Link Management message to the Access Network on an access channel to request the number of reverse carrier links supported by the Access Terminal according to its current situation (such as the power amplification state and the data quantity in a buffer). Therefore, the Access Terminal can make fully use of the power amplification resource and increase the utilization rate of the air interface wireless resource.

BRIEF DESCRIPTION OF THE DRAWINGS

The invention will become more readily apparent from the Detailed Description of the Invention, in which.

DETAILED DESCRIPTION OF THE INVENTION

In order to make the principle, characteristic and advantage of the invention clearer, the specific embodiments of the invention will be described by taking an NxEV-DO system as an example with reference to the attached drawings.

The embodiments of the present invention can be applied to the NxEV-DO system and also are compatible with the 1xEV-DO system. The improvement is made on the C.S0024-A-V1.0 protocol.

Figure 3:
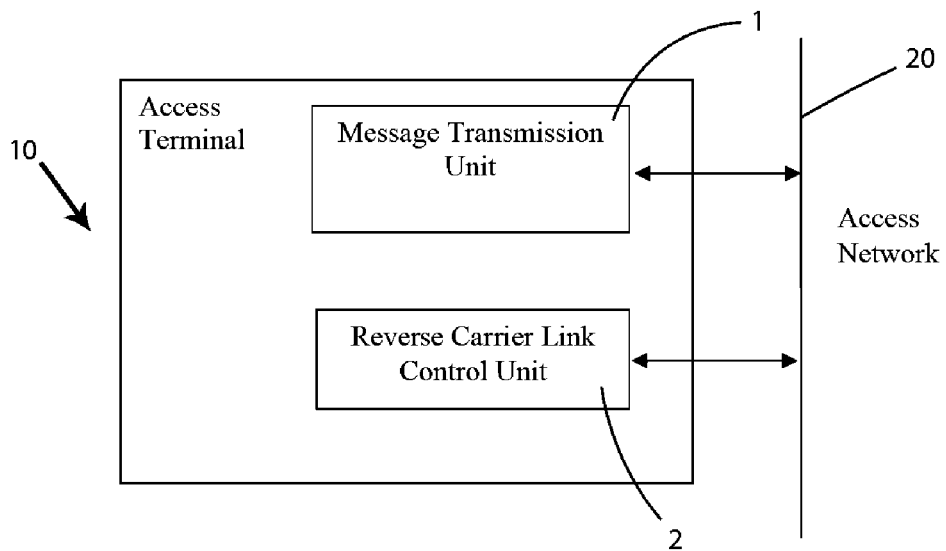
FIG. 3 is a block diagram illustrating the structure of an exemplified access terminal according to an embodiment of the invention.

FIG. 3 is a schematic diagram illustrating the structure of an AT 10 of an embodiment of the invention. It can be seen from FIG. 3, two functional units are added to the existing terminal: a reverse carrier link control unit 2 and a message transmission unit 1.

By using the two functional units, the AT 10 may exchange reverse carrier link messages with the AN 20 and control to establish one or more reverse carrier links.

Specifically, the message transmission unit 1 sends a Reverse Link Management message to the AN 20 according to a control signal sent by the reverse carrier link control unit 2.

The reverse carrier link control unit 2 receives a Traffic Channel Assignment message sent by the AN 20, and establishes one or more reverse carrier links of the AT 10 according to the Traffic Channel Assignment message.

A Reverse Link Management message is set in an embodiment of the invention. The message can indicate the number of reverse carrier links the AT can support currently and also can indicate the information of one or more reverse carrier links the AT has dropped. The Reverse Link Management message is sent by the AT to the AN.

TABLE 1

Field Information of the Reverse Link Management message

| Field | Length (bits) |
|---|---|
| MessageID | 8 |
| MessageSequence | 8 |
| LinkDroppedIndication | 1 |
| Num of Reverse Links | 4 |

The following fields appear multiple times according to the value of the field Num of Reverse Links:

| ReverseLinkIndex | 0 or 4 |
|---|---|

| Reserved | Variable |
|---|---|

Firstly, the above fields are respectively explained as follows:

Message ID refers to a message identification. Message IDs are used to distinguish different messages so that each message corresponds to a unique Message ID.

MessageSequence refers to a message sequence number. The AT sets this field to take the MessageSequence value of the latest Traffic Channel Assignment message it received.

LinkDroppedIndication refers to a link dropped indication. If this field is set to '1', the message indicates that the AT 10 reports information of one or more reverse carrier links the AT 10 has dropped to the AN 20. If this field is set to '0', the message indicates that the AT 10 reports the number of reverse carrier links the AT 10 can support currently to the AN 20.

Num of Reverse Links refers to the number of reverse links. If the LinkDroppedIndication is "0", the field Num of Reverse Links indicates the number obtained by subtracting 1 from the number of reverse carrier links which the AT 10 reports to the AN 20 it can support. If the LinkDroppedIndication is "1", the field Num of Reverse Links indicates the number obtained by subtracting 1 from the number of reverse carrier links the AT 10 has dropped.

ReverseLinkIndex refers to a reverse link index. The field ReverseLinkIndex is included in the message only when the LinkDroppedIndication field is "1". Otherwise, the field ReverseLinkIndex is not included in the message. The field ReverseLinkIndex is consistent with the sequence of the reverse carrier frequency points indicated by the Traffic Channel Assignment (TCA) message in step S12 of FIG. 4 which has the same MessageSequence field as that of the message including the field ReverseLinkIndex. For example, if the field ReverseLinkIndex is '0000', it indicates a reverse carrier link with the lowest frequency point in the corresponding TCA message. If the field ReverseLinkIndex is '0001', it indicates a reverse carrier link with the frequency point immediately next to the lowest frequency point in the TCA message. The rest cases may be deduced by analogy.

Reserved refers to this field is reserved. The field Reserved is set to be all '0' by the AT 10, and the number of '0' makes the length of the message be integral times of 8 bits.

TABLE 2 information fields of the message

| Channel | AC | RTC |
|---|---|---|

| Addressing | Unicast |
|---|---|

| SLP | Best Effort |
|---|---|

| Priority | 40 |
|---|---|

Information fields in table 2 need to be included in each of the messages, in which:

Channel: This field indicates which channel can be used to transmit this message and the channel may be for example an AC or a RTC.

Addressing: This field indicates that this message is transmitted in a unicast mode rather than in a broadcast mode or in a multicast mode.

SLP: This field indicates that this message is transmitted in a best effort mode. In the best effort mode, the message is sent only once and the message may be erased in the transmission.

Priority: This field indicates the priority of sending this message where the smaller the number is, the higher the priority is.

Figure 4:
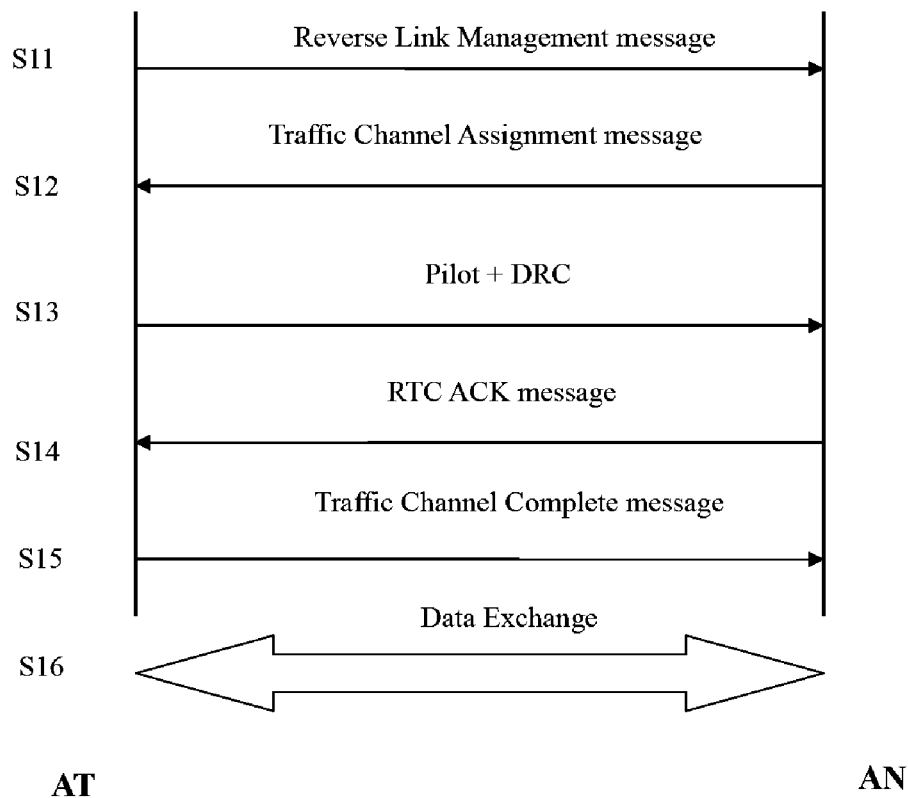
FIG. 4 is a flowchart illustrating a method according to an embodiment of the invention.

FIG. 4 is a flowchart illustrating a method of initiating a Reverse Link Management message by an idle AT 10 on its own initiative according to an embodiment of the invention. As shown, the method includes the following processes:

S11: The AT 10 sends a Reverse Link Management message on an access channel to the AN 20, by means of which the AT 10 requests the number of reverse carrier links the AT 10 can support according to the AT's current condition (e.g., power amplification state, data quantity in the buffer).

S12: The AN 20 sends a Traffic Channel Assignment message according to the received Reverse Link Management message and the Traffic Channel Assignment message includes specific information of the forward and reverse channels.

In the NxEV-DO system, the Traffic Channel Assignment message sent by the AN 20 needs to be expanded on the basis of C.S0024-A-V1.0. The Traffic Channel Assignment message includes information of relevant channels.

The forward channel information includes carrier frequencies of one or more forward carrier links, sector information for transmission of the forward channel, MAC index information assigned to the AT 10 for identifying data packets transmitted to the AT 10 and so on.

The reverse channel information includes carrier frequencies of one or more reverse carrier links, MAC index information of a power control channel (a forward channel used for controlling the transmission power of the reverse channel), forward channel index information for transmitting the power control channel and so on.

S13: The AT 10 establishes one or more newly assigned reverse carrier links according to the contents contained in the Traffic Channel Assignment message and sends a pilot signal and a DRC signal to the AN 20.

The reverse pilot channel is mainly provided to help the AN 20 to hunt a reverse channel and to implement coherent demodulation.

The DRC channel is a data rate control channel transmitted by the AT 10 for notifying the AN 20 of the forward traffic channel rate requested by the AT 10 and the service sector selected by the AT 10.

S14: The AN 20 sends an RTC ACK message to acknowledge receipt of the reverse traffic channel.

S15: The AT 10 sends a Traffic Channel Complete message on the reverse traffic channel and shuts down the timer.

The AT 10 starts the timer when sending the connection request. If the connection can be established within the time period determined by the timer, the timer is shut down. Otherwise, the time period determined by the timer expires and the AT 10 is changed to another state.

S16: The AT 10 and the AN 20 start to exchange data on both the prior and newly assigned traffic channels.

Figure 1:
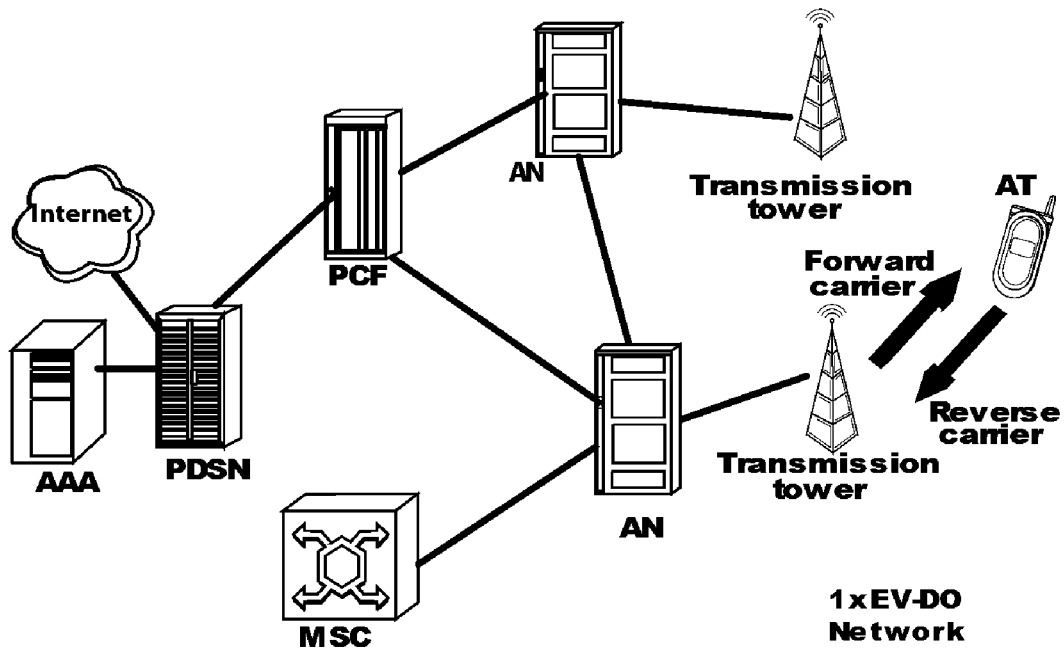
FIG. 1 is a diagram illustrating the structure of a 1xEV-DO system in the prior art.
Figure 2:
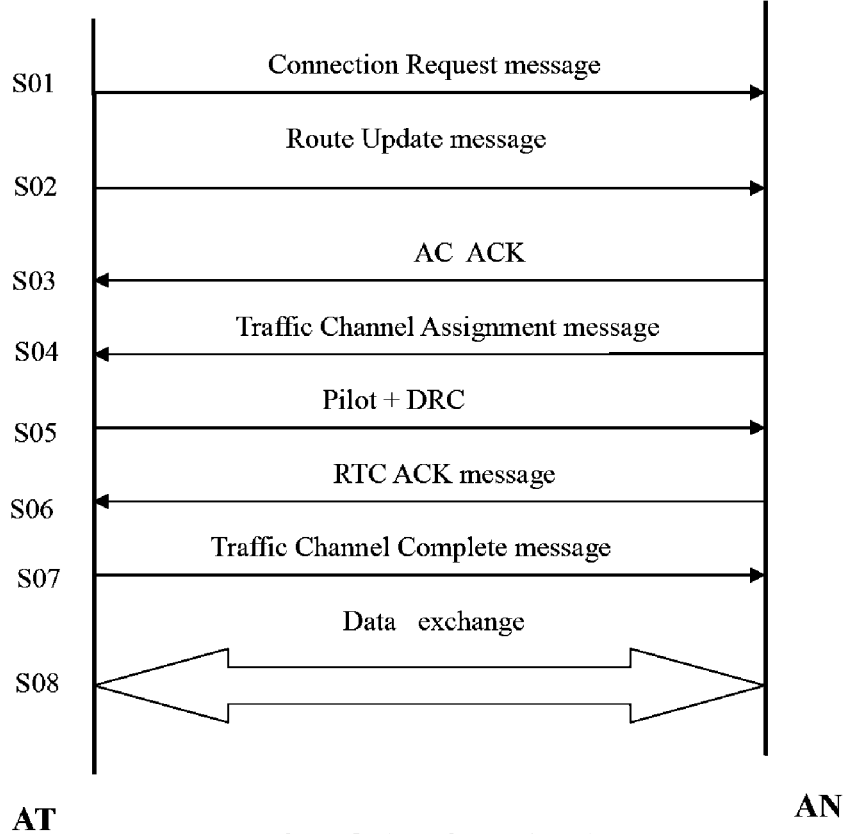
FIG. 2 is a flowchart illustrating an AT initiating a connection request on its own initiative in the prior art.
Figure 5:
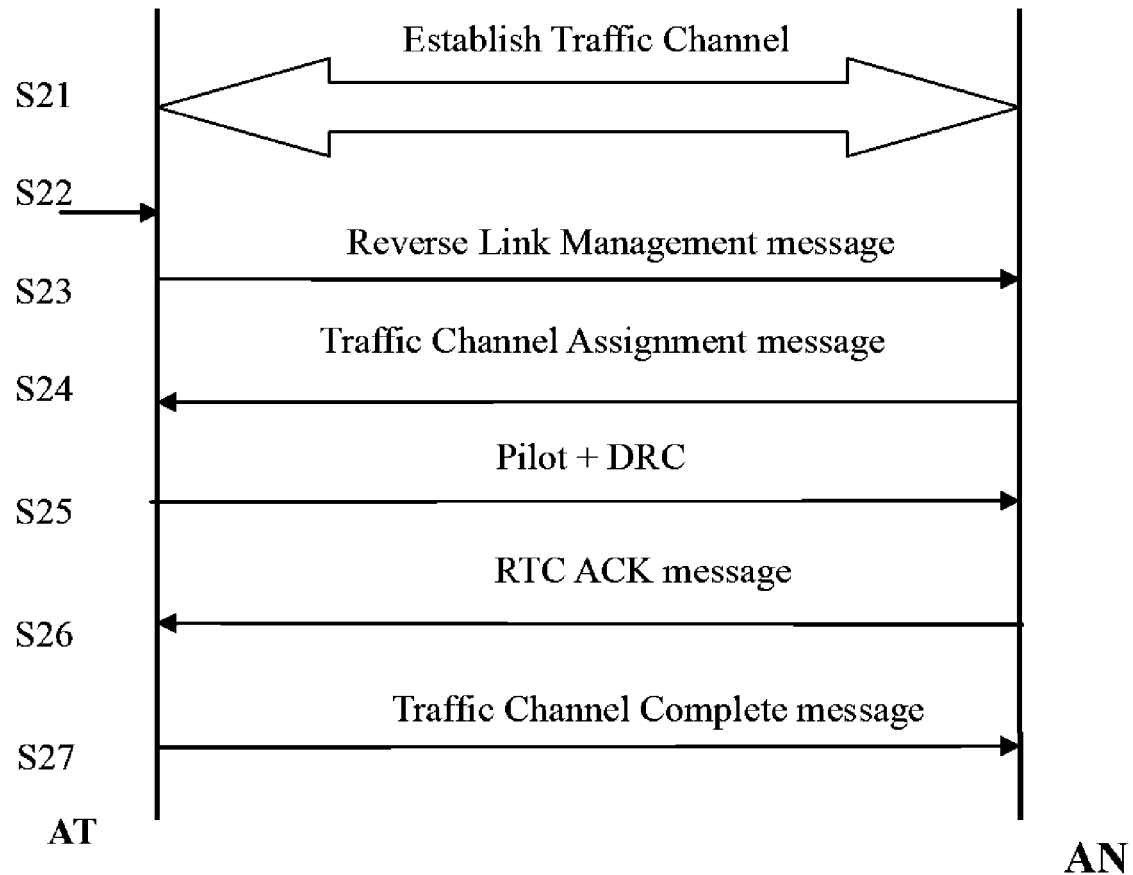
FIG. 5 is a flowchart illustrating a method according to another embodiment of the invention.

FIG. 5 is a specific flowchart illustrating a method of initiating a Reverse Link Management message by an AT 10 in the service state according to another embodiment of the invention. As shown, the method includes the following processes:

S21: A traffic channel is established. The process for establishing the traffic channel is the same as the information exchange process used by the AT 10 to initiate a connection request as illustrated in FIG. 2 and therefore the description is omitted here.

S22: After the traffic channel is established, the AT 10 determines whether the reverse carrier links it can support have changed or whether it has dropped one or more reverse carrier links.

S23: The AT 10 sends a Reverse Link Management message to the AN 20 to request the number of reverse carrier links the AT 10 can support currently or to report information of the one or more reverse carrier links the AT 10 has dropped.

S24: The AN 20 sends a Traffic Channel Assignment message to assign the forward and reverse carrier links. When sending the Traffic Channel Assignment message, the AN 20 assigns with its best effort the number of reverse carrier links which can meet the number requested by the AT 10 according to the received Reverse Link Management message.

S25: The AT 10 establishes one or more reverse carrier links and sends a pilot signal and a DRC signal to the AN 20.

S26: The AN 20 sends an RTC Ack message to acknowledge receipt of the reverse traffic channel.

S27: The AT 10 sends a Traffic Channel Complete message on the reverse traffic channel.

In embodiments of the present invention, the AT 10 can send a Reverse Link Management message to the AN 20 on its own initiative to request the number of reverse carrier links the AT 10 can support or to report information of one or more reverse carrier links the AT 10 has dropped. The Reverse Link Management message does not make any modification to the existing messages. Therefore, the backward compatibility can be kept. The embodiments of the invention enable the AT 10 to request or drop one or more reverse carrier links dynamically and flexibly according to need, and the AT 10 can make fully use of the power amplification resource and increase the utilization rate of the air interface wireless resource.

In one embodiment of the invention, the function described above can also be achieved by using two separate messages. One message is used by the AT 10 to inform the AN 20 of the number of reverse carrier links the AT 10 can support currently. The other message is used by the AT 10 to report the information of one or more reverse carrier links the AT 10 has dropped to the AN 20. The message exchange flow is in conformity with that shown in FIG. 4 or FIG. 5.

While the principle of the present invention has been illustrated and described with reference to the above embodiments, the present invention is not limited to this. It is evident that those skilled in the art may make various changes and modifications to the present invention without departing from the spirit and scope thereof. Therefore, the present invention is intended to include these changes and modifications provided that they fall within the scope of the appended claims and all forseeable equivalents thereof.

What is claimed is:

1. A reverse link management method for use in a multi-carrier wireless communication system, the method comprising:

sending, by an Access Terminal, a Reverse Link Management message to an Access Network, the Reverse Link Management message carrying information of one or more reverse carrier links that the Access Terminal has dropped;

wherein the Reverse Link Management message contains a message sequence number, a link dropped indication and reverse link index information; and wherein the reverse link index information of the Reverse Link Management message corresponds with the one or more reverse carrier links assigned according to a Traffic Channel Assignment message.

2. The method according to claim 1, further comprising:

assigning, by the Access Network, the one or more reverse carrier links according to the received Reverse Link Management message and sending the Traffic Channel Assignment message to the Access Terminal; and establishing, by the Access Terminal, the one or more reverse carrier links according to the Traffic Channel Assignment message.

3. The method according to claim 1, wherein the Reverse Link Management message is transmitted on a reverse access channel or a reverse traffic channel.

4. The method according to claim 1, wherein the Reverse Link Management message carries information of the number of reverse carrier links that the Access Terminal currently can support.

5. A reverse link management method for use in a multi-carrier wireless communication system, the method comprising:

sending, by an Access Terminal, a second Reverse Link Management message to an Access Network, the second Reverse Link Management message carrying information of the number of reverse carrier links that the Access Terminal currently can support;

sending, by the Access Terminal, a first Reverse Link Management message, the first Reverse Link Management message carrying information of one or more reverse carrier links that the Access Terminal has dropped;

wherein the first Reverse Link Management message contains a message sequence number, a link dropped indication and reverse link index information;

wherein the reverse link index information of the first Reverse Link Management message corresponds with the one or more reverse carrier links assigned according to a Traffic Channel Assignment message;

wherein the second Reverse Link Management message is sent after a traffic channel is established.

6. The method according to claim 5, further comprising the steps of:

sending, by the Access Network, the Traffic Channel Assignment message to the Access Terminal so as to assign one or more new reverse carrier links according to the received second Reverse Link Management message; and establishing, by the Access Terminal, the one or more new reverse carrier links according to the Traffic Channel Assignment Message.

7. The method according to claim 5, wherein the first Reverse Link Management message or the second Reverse Link Management message is transmitted on a reverse access channel or an existing reverse traffic channel.

8. A reverse link management apparatus for use in a multicarrier wireless communication system, the apparatus comprising:

an Access Terminal configured to send a Reverse Link Management message to an Access Network, wherein the Reverse Link Management message carries information of one or more reverse carrier links that the Access Terminal has dropped;

wherein the Reverse Link Management message contains a message sequence number, a link dropped indication and reverse link index information; and wherein the reverse link index information of the Reverse Link Management message corresponds with the one or more reverse carrier links assigned according to a Traffic Channel Assignment message.

9. The reverse link management apparatus according to claim 8, wherein the Reverse Link Management message carries information of the number of reverse carrier links that the Access Terminal currently can support.

10. The reverse link management apparatus according to claim 8, wherein the Access Terminal further comprises:

a link control unit; and a message transmission unit configured to send the Reverse Link Management message to the Access Network according to a control signal sent by the link control unit, wherein the link control unit is configured to receive the Traffic Channel Assignment message sent by the Access Network and to control the Access Terminal to establish one or more reverse carrier links according to the Traffic Channel Assignment message.

11. The reverse link management apparatus according to claim 8, wherein the Reverse Link Management message is transmitted on a reverse access channel or a reverse traffic channel.

12. A reverse link management apparatus for use in a multicarrier wireless communication system, the apparatus comprising:

an Access Terminal, configured to send a second Reverse Link Management message to an Access Network, wherein the second Reverse Link Management message carries information of the number of reverse carrier links that the Access Terminal currently can support;

wherein the Access Terminal is further configured to send a first Reverse Link Management message, the first Reverse Link Management message carrying information of one or more reverse carrier links that the Access Terminal has dropped;

wherein the first Reverse Link Management message contains a message sequence number, a link dropped indication and reverse link index information;

wherein the reverse link index information of the first Reverse Link Management message corresponds with the one or more reverse carrier links assigned according to a Traffic Channel Assignment message;

wherein the second Reverse Link Management message is sent after a traffic channel is established.

13. The reverse link management apparatus according to claim 12, wherein the Access Terminal is further configured to receive the Traffic Channel Assignment message sent by the Access Network, wherein the Traffic Channel Assignment message indicates one or more reverse carrier links associated with the information of the number of the reverse carrier links that are assigned by the Access Network, wherein the Access Terminal is further configured to establish the one or more reverse carrier links according to the Traffic Channel Assignment Message.

14. The reverse link management apparatus according to claim 12, wherein the first Reverse Link Management message or the second Reverse Link Management message is transmitted on a reverse access channel or an existing reverse traffic channel.

15. A reverse link management apparatus for use in a multicarrier wireless communication system, the apparatus comprising:

an Access Network component, configured to receive a second Reverse Link Management message from an Access Terminal, wherein the second Reverse Link Management message carries information of the number of reverse carrier links that the Access Terminal currently can support; and the Access Network component further configured to assign one or more reverse carrier links associated with the information of the number of the reverse carrier links;

wherein the Access Network component is further configured to receive a first Reverse Link Management message, the first Reverse Link Management message carrying information of one or more reverse carrier links that the Access Terminal has dropped;

wherein the first Reverse Link Management message contains a message sequence number, a link dropped indication and reverse link index information;

wherein the reverse link index information of the first Reverse Link Management message corresponds with the one or more reverse carrier links assigned according to a Traffic Channel Assignment message;

wherein the second Reverse Link Management message is sent after a traffic channel is established.

16. The reverse link management apparatus according to claim 15, wherein the Access Network component is further configured to assign the number of the reverse carrier links that the Access Terminal currently can support.

17. The reverse link management apparatus according to claim 15, wherein the first Reverse Link Management message or the second Reverse Link Management message is transmitted on a reverse access channel or an existing reverse traffic channel.

18. A reverse link management method for use in a multicarrier wireless communication system, the method comprising:

receiving, by an Access Network component, a Reverse Link Management message sent by an Access Terminal, the Reverse Link Management message carrying information of one or more reverse carrier links that the Access Terminal has dropped;

wherein the Reverse Link Management message contains a message sequence number, a link dropped indication and reverse link index information; and wherein the reverse link index information of the Reverse Link Management message corresponds with the one or more reverse carrier links assigned according to a Traffic Channel Assignment message.

19. The method according to claim 18, wherein the Reverse Link Management message is transmitted on a reverse access channel or a reverse traffic channel.

20. A reverse link management apparatus for use in a multicarrier wireless communication system, the apparatus comprising:

an Access Network component, configured to receive a Reverse Link Management message sent by an Access Terminal, the Reverse Link Management message carrying information of one or more reverse carrier links that the Access Terminal has dropped;

wherein the Reverse Link Management message contains a message sequence number, a link dropped indication and reverse link index information; and wherein the reverse link index information of the Reverse Link Management message corresponds with the one or more reverse carrier links assigned according to a Traffic Channel Assignment message.

21. The apparatus according to claim 20, wherein the Reverse Link Management message is transmitted on a reverse access channel or a reverse traffic channel.

* * * * *